US009167559B2

(12) United States Patent
Mueller et al.

(10) Patent No.: US 9,167,559 B2
(45) Date of Patent: Oct. 20, 2015

(54) PROCESS FOR ENABLING COMMUNICATION OF A COMMUNICATION DEVICE OVER A SPECTRUM

(76) Inventors: Werner Klaus Mueller, Achim (DE); Raymond Faroudi, Venice, FL (US)

( * ) Notice: Subject to any disclaimer, the term of this patent is extended or adjusted under 35 U.S.C. 154(b) by 1070 days.

(21) Appl. No.: 12/176,583

(22) Filed: Jul. 21, 2008

(65) Prior Publication Data

US 2010/0015924 A1    Jan. 21, 2010

(51) Int. Cl.
*H04W 72/00* (2009.01)
*H04W 72/02* (2009.01)

(52) U.S. Cl.
CPC ..................... *H04W 72/02* (2013.01)

(58) Field of Classification Search
CPC .................................................. H04B 1/1027
USPC .................... 455/62, 134, 425, 454
See application file for complete search history.

(56) References Cited

U.S. PATENT DOCUMENTS

| | | | |
|---|---|---|---|
| 4,716,590 A * | 12/1987 | Takahashi et al. | 381/15 |
| 4,918,381 A * | 4/1990 | Bender et al. | 324/76.21 |
| 5,649,001 A | 7/1997 | Thomas et al. | |
| 7,016,334 B2 | 3/2006 | Cohen et al. | |
| 7,035,319 B2 * | 4/2006 | Thron et al. | 375/148 |
| 2004/0081129 A1 | 4/2004 | Haller et al. | |
| 2005/0025299 A1 | 2/2005 | Tischer et al. | |
| 2005/0025305 A1 | 2/2005 | Tischer et al. | |
| 2005/0025308 A1 | 2/2005 | Tischer et al. | |
| 2005/0032435 A1 | 2/2005 | Tischer et al. | |
| 2005/0159153 A1 | 7/2005 | Mousseau et al. | |
| 2005/0190747 A1 | 9/2005 | Sindhwani et al. | |
| 2005/0271011 A1 | 12/2005 | Alemany et al. | |
| 2005/0272449 A1 * | 12/2005 | Gallagher et al. | 455/458 |
| 2006/0128308 A1 * | 6/2006 | Michael et al. | 455/41.2 |
| 2006/0154643 A1 | 7/2006 | Scholz | |
| 2006/0172737 A1 | 8/2006 | Hind et al. | |
| 2008/0004009 A1 * | 1/2008 | Caldwell et al. | 455/434 |

FOREIGN PATENT DOCUMENTS

WO    WO-2006053420    5/2006

* cited by examiner

*Primary Examiner* — Wen Huang
(74) *Attorney, Agent, or Firm* — Gifford, Krass, Sprinkle, Anderson & Citkowski, P.C.

(57) ABSTRACT

In one aspect, there is disclosed a process for enabling communication of a communication device over a spectrum including the steps of: providing a communication device, detecting available analog signals, analyzing the detected analog signals, connecting to a highest energy signal, and repeating these steps.

11 Claims, 5 Drawing Sheets

PROCESS FOR ENABLING COMMUNICATION OF A COMMUNICATION DEVICE OVER A SPECTRUM

FIELD OF THE INVENTION

The invention relates to processes for enabling communication of a communication device over a spectrum.

BACKGROUND OF THE INVENTION

Generally communication devices, for example wireless communication devices including a cell phone, are able to communicate over a narrow frequency band. Additionally, such devices typically are limited to a specific signal that is dictated by the hardware of the communication device. For example, cellular phones may be limited by the communication protocols hardwired into the device or provided by SIM cards associated with the device. Such devices are limited in that they may only communicate using signals designated by the hardware of the device. The signals dictated by the hardware of the device may not provide the fastest or best communication of the device in comparison to other signals that may be available for use. There is therefore a need in the art for a process for enabling communication of a communication device over a spectrum such that various signals may be utilized by the device. Additionally, there is a need in the art for a process for enabling communication that allows for the highest energy signal to be utilized by the device. Further, there is a need in the art for a process for enabling communication of a communication device over a spectrum such that the communication between various signals is not detected by a user.

SUMMARY OF THE INVENTION

In one aspect, there is disclosed a process for enabling communication of a communication device over a spectrum including the steps of: providing a communication device, detecting available analog signals, analyzing the detected analog signals, connecting to a highest energy signal, and repeating these steps.

In another aspect, there is disclosed a process for enabling communication of a communication device over the spectrum that includes the steps of: providing a communication device, detecting available analog signals, analyzing the detected analog signals, and connecting to a highest energy signal, wherein the steps are performed in less than 23 milliseconds.

DETAILED DESCRIPTION OF THE PREFERRED EMBODIMENTS

Figure 1:
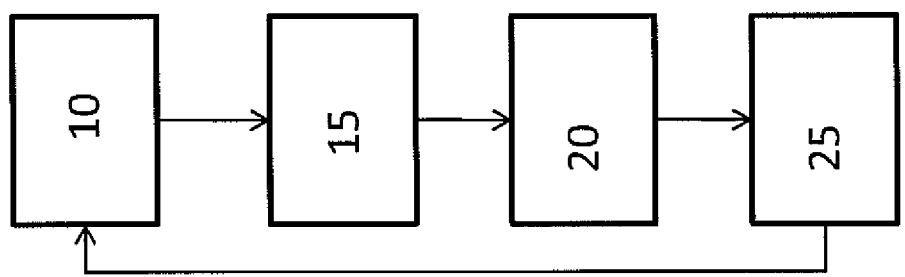
FIG. 1 is a flow diagram of the steps of the process for enabling communication.

Referring to FIG. 1, there is shown a flow diagram for a process for enabling communication of a communication device over a spectrum. As can be seen in the diagram, the process includes the step of providing a communication device 10. The communication device may include various devices such as cellular phones, GPS receivers, PDAs, computers, and any other communication device that may utilize an analog signal for communicating data. The data may be in the form of voice signals, numerical information, or any other data that may be communicated by the device.

The process for enabling communication of a communication device over a spectrum also includes the step of detecting available analog signals 15. Various hardware may be associated with the communication device to allow detection of analog signals having a frequency of from 1 Hertz to 66 Gigahertz. The process also includes the step of analyzing the detected analog signals 20, and connecting to a highest energy signal 25. The preceding steps may then be repeated.

The step of detecting available analog signals 15, as outlined above, may be performed using appropriate hardware associated with the communication device. Various hardware systems such as a. Frequency Information:
  i. Frequency Status
  ii. ITU Class of Station
  iii. Frequency Record ID
  iv. Fee Table Code 1
  v. Necessary Bandwidth (hbcnb (kHz))
  vi. Radio Model Code
b. Tx Information:
  i. Tx Frequency (MHz), Tx Channel Capacity Code, Tx Total Losses (dB), Tx Spectrum Signature Code, Tx Power (dBW), Tx Effective Radiated Power (ERP) (dBW), Tx Antenna Beamwidth (deg), Tx Antenna Pattern Code, Tx Antenna Gain (dBi>810 MHz, dBd<810 MHz), Tx Antenna Polarization Code, Tx Antenna Azimuth (deg), Tx Antenna Vertical Elevation Angle (deg), Tx Antenna Height Above Ground Level (m), Tx Antenna ID
c. Rx Information:
  i. Unfaded Received Signal Level (dBW), Rx Threshold Level for BER 10E-2 (dBW), Rx Frequency (MHz), Rx Channel Capacity Code, Rx Total Losses (dB), Rx Spectrum Signature Code, Rx Antenna Beamwidth (deg), Rx Antenna Pattern Code, Rx Antenna Gain (dBi>810 MHz, dBd<810 MHz), Rx Antenna Polarization Code, Rx Antenna Azimuth (deg), Rx Antenna Vertical Elevation Angle (deg), Rx Antenna Height Above Ground Level (m), Rx Antenna ID
  ii. TX/RX, Tuned Frequency, Loss, Filter Device Code, Manufacturer Code and, Model ID
d. Spectral efficiency Values:
  i. [H]=Net bitrate (R) per frequency channel (Mbit/s)), [B]=Bandwith (B) per frequency channel (MHz), [C]=Link spectral efficiency (R/B) ((bit/s)/Hz), [R]=Typical reuse Factor (reciprocally K), [W]=System spectral efficiency Approximately (R/B/K ((bit/s)Hz per site). Assembly of parts;
    1. WiMaX=IEEE 802.16, [H]/[B]/[C]/[R]/[W]
    2. Digital Radio=DAB, [H]/[B]/[C]/[R]/[W]
    3. Digital radio=DAB with SFN, [H]/[B]/[C]/[R]/[W]
    4. Digital TV=DVB-T, [H]/[B]/[C]/[R]/[W]
    5. Digital TV=DVB-T with SFN, [H]/[B]/[C]/[R]/[W]
    6. Wi-Fi=IEEE 802.11a/b/g/h/n/, [H]/[B]/[C]/[R]/[W]
    7. 4GCellular=LTE, [H]/[B]/[C]/[R]/[W]
    8. 3.5G Cellular=HSPA, [H]/[B]/[C]/[R]/[W]

9. 3G Cellular=WCDMA(FDD), [H]/[B]/[C]/[R]/[W]
10. 3G Cellular=WCDMA2000 (1xEVDO), [H]/[B]/[C]/[R]/[W]
11. 3G Cellular=WCDMA2000 (1xPD), [H]/[B]/[C]/[R]/[W]
12. 3G Cellular=WCDMA2000 (1xVoice), [H]/[B]/[C]/[R]/[W]
13. 2.75G Cellular=IS-136HS+EDGE, [H]/[B]/[C]/[R]/[W]
14. 2.75G Cellular=GSM+EDGE, [H]/[B]/[C]/[R]/[W]
15. 2G Cellular=D-AMPS, [H]/[B]/[C]/[R]/[W]
16. 2G Cellular=GSM, [H]/[B]/[C]/[R]/[W]
17. ADSL2 Downlink=OFDM, [H]/[B]/[C]/[R]/[W]
18. Hybrid Connect=GT Pro . . . , [H]/[B]/[C]/[R]/[W]

may be utilized.

In one aspect, the step of detecting the available analog signals 15 includes calculating the highest energy signal according over the process of identifying component frequencies in data to the formula, $$x_r = \sum_{m=-n}^{n} R_m \cos(2\pi m f_1 r \Delta + \phi_m) \quad \text{Formula 1}$$

The highest energy signal may be represented by the term $x_{max}$ which is equal to $$f(x) = a_0 + \sum_{n=1}^{\infty} \left( a_n \cos\frac{n\pi x}{L} + b_n \sin\frac{n\pi x}{L} \right).$$

Figure 2:
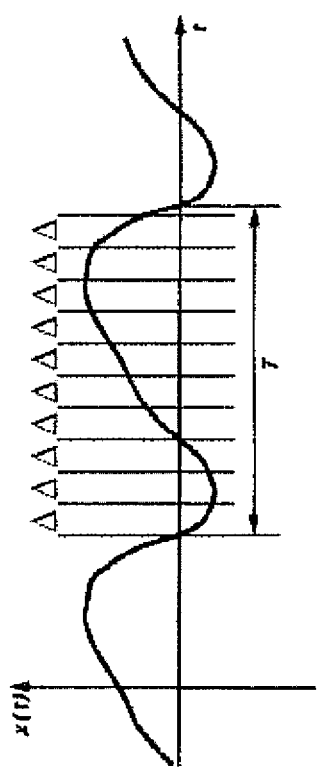
FIG. 2 is a graphic representation of a Fourier time series.
Figure 3:
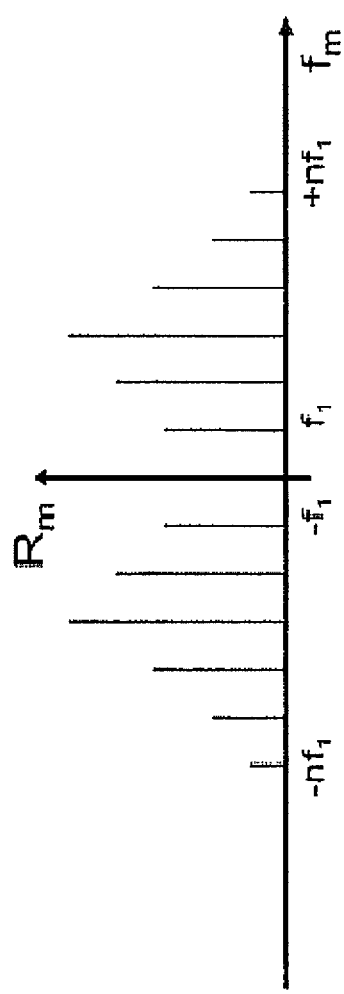
FIG. 3 is a graphic representation of an amplitude of the cosine series as a function of their frequencies in a two-sided amplitude spectrum.

In the formula outlined above, $x_r$ is the Fourier time series and $R_m$ is the amplitude of the $m^{th}$ harmonic. $mf_1$ is the frequency of the $m^{th}$ harmonic and $\phi_m$ is the phase of the $m^{th}$ harmonic. The Fourier time series may be graphically represented as shown in FIG. 2. As can be seen in FIG. 2, the Fourier time series is represented as a function of an arbitrary periodic function such as a cosine wave plotted versus time. As can be seen, the time series is divided over time intervals Δ over a specified period denoted by t. The Fourier time series allows the breakdown of the spectrum into cosine functions to allow communication over a plurality of different signals by the communication device. Additionally, as shown in FIG. 3, the amplitudes of the cosine series may be represented as a function of the frequencies in a two sided spectrum.

Again as outlined above, the process for enabling communication of a communication device includes the step of analyzing the detected analog signals 20. The step of analyzing the analog signals 20 includes calculating a value according to the formula $$x_r = \sum_{m=-n}^{n} R_m \cos(2\pi m f_1 r \Delta + \phi_m) \quad \text{Formula 2}$$

$x_r$ again is the Fourier time series, $R_m$ is the amplitude of the $m^{th}$ harmonic, $mf_1$ is the frequency of the $m^{th}$ harmonic and $\phi_m$ is the phase of the $m^{th}$ harmonic. The step of analyzing the analog signals 20 further includes calculating a value according to the formula $$X_m = A_m - iB_m \text{ where} \quad \text{Formula 3}$$
$$|X_m| = \sqrt{A_m^2 + B_m^2} = R_m,$$
$$\phi_m = \arctan\left(-\frac{B_m}{A_m}\right).$$

The above formula for $X_m$ representing the Fourier time series includes the Fourier coefficients $A_m$ and $B_m$. As can be seen, $R_m$ is defined as the absolute value of $X_m$ which is equal to the square root of the summation of the squares of the Fourier coefficients. Additionally, $\phi_m$ is defined as the arctangent of the negative of $B_m$ divided by $A_m$.

The step of analyzing the analog signals 20 also includes calculating a value according to the formula

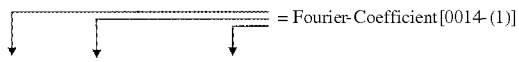

= Fourier-Coefficient[0014-(1)]   Formula 4

$$x_r = A_0 + 2\sum_{m=1}^{n} (A_m \cos 2\pi m f_1 r \Delta + B_m \sin 2\pi m f_1 r \Delta)$$

$$A_0 = \frac{1}{N}\sum_{r=-n}^{n} x_T \quad \begin{matrix}\text{Average time}\\\text{series annalysis}\end{matrix} = \text{Fourier-Coefficient}(Ao) \ [0014\text{-}(2)]$$

$$A_m = \frac{1}{N}\sum_{r=-n}^{n} x_r \cos\frac{2\pi mr}{N} = \text{Fourier-Coefficient}(Am) \ [0014\text{-}(3)]$$

$$B_m = \frac{1}{N}\sum_{r=-n}^{n} x_r \sin\frac{2\pi mr}{N} = \text{Fourier-Coefficient}(Bm) \ [0014\text{-}(4)]$$

$$x_r = \frac{1}{N}\sum_{r=-n}^{n} x_r + 2\sum_{m=1}^{n}\left(\frac{1}{N}\sum_{r=-n}^{n} x_r\cos\frac{2\pi mr}{N}\cos 2\pi m f_1 r\Delta + \frac{1}{N}\sum_{r=-n}^{n} x_r\sin\frac{2\pi mr}{N}\sin 2\pi m f_1 r\Delta\right)$$

As can be seen from the above formula, the Fourier coefficients are defined in terms of the mean value of the time series. $A_0$, $A_m$ and $B_m$ are defined by the product of $$\frac{1}{N}$$

times the Fourier time series that is from −n to n steps. The product of the $$\frac{1}{N}$$

and summation of the Fourier time series is multiplied by either the cosine or sine functions of 2πmr divided by N.

The step of analyzing the analog signals 20 fiber includes calculating a value according to the formula $$X_r = \Sigma_{m=-n}{}^n (R_m \cos(2\pi m f_1 r\Delta - \phi_m))$$

$$Rm = \sqrt{A_m{}^2 + B_m{}^2}$$

$$\phi_m = \arctan(-B_m/A_m) \quad \text{Formula 5}$$

Formula 5

In this calculation, the values of $R_m$ and $\phi_m$ are defined in terms of the formula provided in Formula 3 outlined above. Following the calculation presented above in Formula 5, the step of analyzing the analog signals 20 further includes calculating a value according to the formula $$x_r = \sum_{m=-n}^{n} R_m \cos(2\pi m f_1 r\Delta + \phi_m) \quad \text{Formula 6}$$

wherein $f_1 = 1/T$ where T is the period.

In this calculation, the value of $f_1$ is set to equal 1/T where T is the period. The manipulation of the Fourier time series $x_r$ according to the above calculations allows for the communication device to communicate over any number of available signals. In one aspect, the steps of detecting the available analog signals 15, analyzing the detected analog signals 20, and connecting to a highest energy signal 25 is performed in less than 23 milliseconds. Performance of the calculations within this timeframe allows seamless communication of the communication device without a noticeable detected differential by a user.

Figure 4:
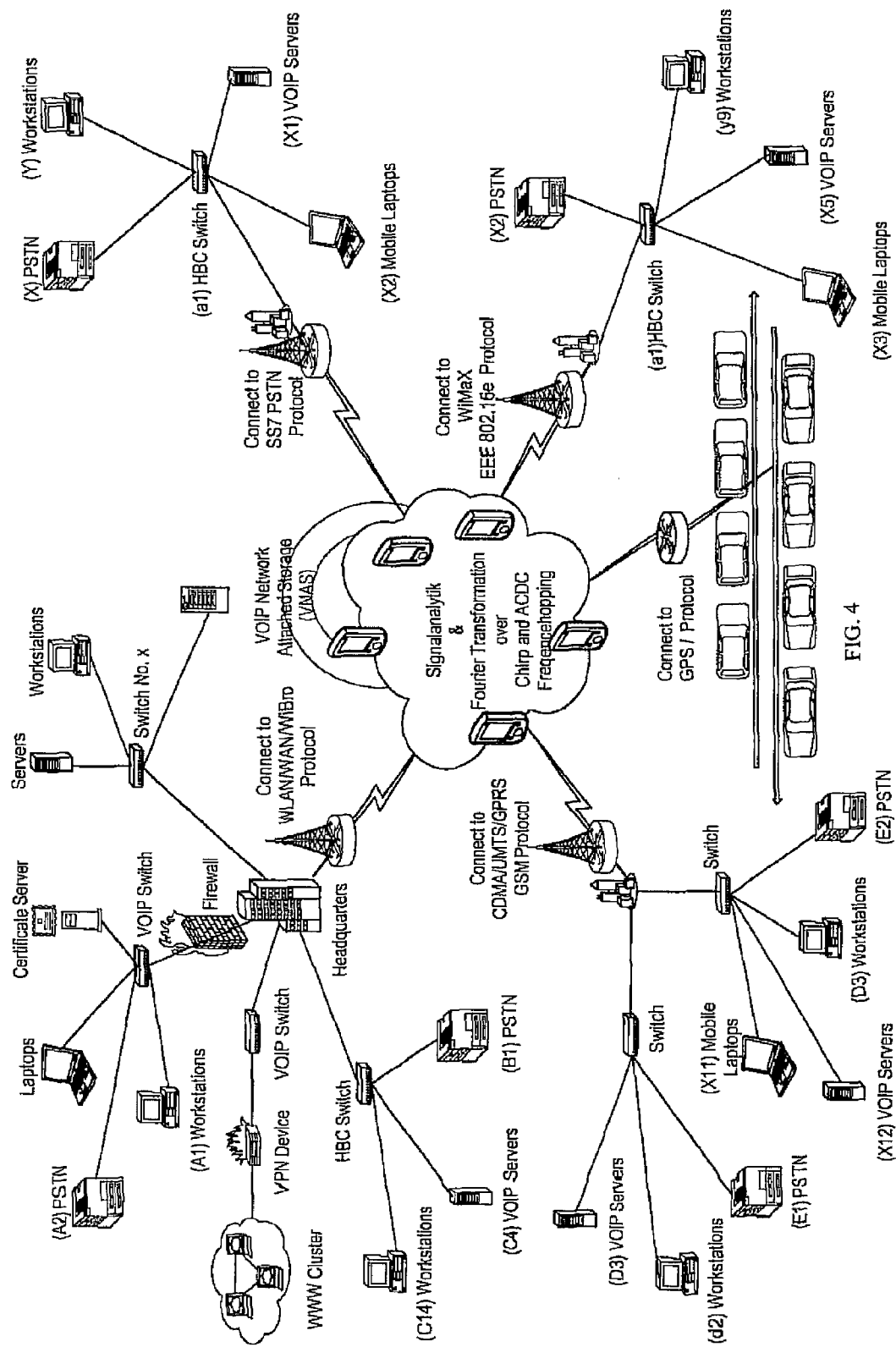
FIG. 4 is a diagram of a communication device with the ability to link to a plurality of networks over a spectrum of signals.

As stated above, the process for enabling communication may be utilized by any communication device. In one example, as outlined in FIG. 4, the communication device may be a wireless communication device such as a cell phone. As can be seen in the figure, the communication device may communicate over various signals. The signal may be selected from various protocols including WLAN, WAN, WiBro, WIFI, CDMA, UMTS, GPRS, GSM, GPS, WiMax, and SS7 PTSN protocols. In use, the communication device may be able to switch between various signals and protocols to provide the highest energy connection to any signal. In this manner, the communication device may switch between the various signals due to movement of the communication device or variation in the signals to provide the best available signal.

Figure 5:
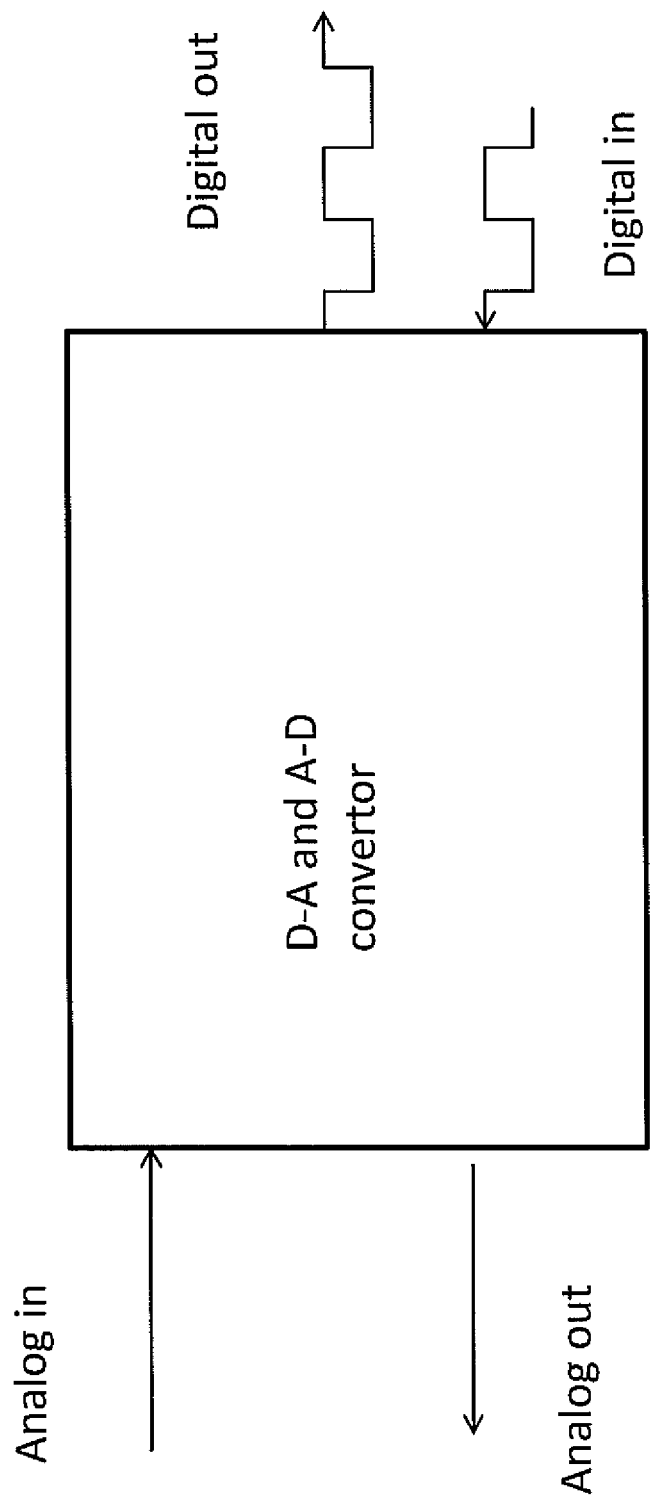
FIG. 5 is a diagram of an analog-to-digital and digital-to-analog converter.

In one aspect, the communication device may include an analog-to-digital and digital-to-analog converter, as shown in FIG. 5. The AD and DA converters will provide the communication device the ability to convert analog signals into digital outputs that may be utilized by the communication device. Additionally, the D to A converter may convert digital output of the communication device into an analog signal for communication. The process for enabling communication may be performed using appropriate hardware in the communication device such as a computer board programmed with appropriate software to perform the steps of the process.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for enabling communication of a communication device for a plurality of signals comprising the steps of:
   a) providing a communication device;
   b) detecting available analog signals having a frequency of from 1 Hertz to 66 Gigahertz defining a spectrum, wherein the step of detecting the available analog signals includes calculating the highest energy signal according to the formula:

$$X_r = \sum_{m=-n}^{n} R_m \text{COS}(2\pi m f_1 r\Delta + \phi_m)$$

and $X_{max} = A_{max} - iB_{max}$
wherein $X_r$ is the Fourier time series, $R_m$ is the amplitude of the $m^{th}$ harmonic, $mf_1$ is the frequency of the $m^{th}$ harmonic and $\phi_m$ is the phase of the $m^{th}$ harmonic, $r\Delta$ is a time series divided over time intervals delta over a specified period denoted by t, Am and Bm are Fourier coefficients for the fourier time series Xm and i represents a dimensionless unit;
   c) analyzing the detected analog signals;
   d) connecting to a highest energy signal; and
   e) repeating steps a) though d).

2. The process for enabling communication for a communication device for a plurality of signals of claim 1 wherein steps a)-d) are performed in less than 23 milliseconds.

3. The process for enabling communication for a communication device for a plurality of signals of claim 1 wherein the communication device is a wireless communication device.

4. The process for enabling communication for a communication device for a plurality of signals of claim 1 wherein the communication device is a cellular phone.

5. The process for enabling communication for a communication device for a plurality of signals of claim 1 wherein the signal is selected from: WLAN, WAN, WiBro, WIFI, CDMA, UMTS, GPRS, GSM, GPS, WiMax, and SS7 PTSN protocols.

6. The process for enabling communication for a communication device for a plurality of signals of claim 1 wherein the step of analyzing includes calculating a value according to the formula:

$$X_m = A_m - iB_m \text{ where}$$

$$|X_m| = \sqrt{A_m^2 + B_m^2} = R_m,$$

$$\phi_m = \arctan\left(-\frac{B_m}{A_m}\right).$$

7. The process for enabling communication for a communication device for a plurality of signals of claim 6 wherein the step of analyzing includes calculating a value according to the formula:

$$X_r = A_0 + 2\sum_{m=1}^{n}(A_m\cos 2\pi m f_1 r\Delta + B_m\sin 2\pi m f_1 r\Delta)$$

$$A_0 = 1/N \sum_{r=-n}^{n} X_r$$

$$A_m = 1/N \sum_{r=-n}^{n} X_r\cos 2\pi mr/N$$

$$B_m = 1/N \sum_{r=-n}^{n} X_r\sin 2\pi mr/N$$

8. The process for enabling communication for a communication device for a plurality of signals of claim 7 wherein the step of analyzing includes calculating a value according to the formula:

$$x_r = \sum_{m=-n}^{n}(R_m\cos(2\pi mf_1 r\Delta + \phi_m))$$

$$Rm = \sqrt{A_m^2 + B_m^2}$$

$$\phi_m = \arctan\left(-\frac{B_m}{A_m}\right).$$

9. The process for enabling communication for a communication device for a plurality of signals of claim 8 wherein the step of analyzing includes calculating a value according to the formula:

$$x_r = \sum_{m=-n}^{n} R_m\cos(2\pi mf_1 r\Delta + \phi_m)$$

wherein $f_1 = 1/T$ where T is the period.

10. The process for enabling communication for a communication device for a plurality of signals of claim 1 wherein the communication device includes analog-to-digital and digital-to-analog converters.

11. A process for enabling communication of a communication device for a plurality of signals comprising the steps of:
   a) providing a communication device;
   b) detecting available analog signals having a frequency of from 1 Hertz to 66 Gigahertz defining a spectrum, wherein the step of detecting the available analog signals includes calculating the highest energy signal according to the formula:

$$x_r = \sum_{m=-n}^{n} R_m\cos(2\pi mf_1 r\Delta + \phi_m)$$

and $X_{max} = A_{max} - iB_{max}$ wherein $X_r$ is the Fourier time series, $R_m$ is the amplitude of the $m^{th}$ harmonic, $mf_1$ is the frequency of the $m^{th}$ harmonic and $\phi_m$ is the phase of the $m^{th}$ harmonic, $r\Delta$ is a time series divided over time intervals delta over a specified period denoted by t, Am and Bm are Fourier coefficients for the fourier time series Xm and i represents a dimensionless unit;

c) analyzing the detected analog signals;
   d) connecting to a highest energy signal wherein steps a)-d) are performed in less than 23 milliseconds; and
   e) repeating steps a) though d).

* * * * *